United States Patent
Prendergast et al.

(10) Patent No.: US 10,015,772 B2
(45) Date of Patent: Jul. 3, 2018

(54) GEO-TAGGED BEACONS FOR WI-FI PERFORMANCE OPTIMIZATION

(71) Applicant: Dell Products L.P., Round Rock, TX (US)

(72) Inventors: Liam Prendergast, Limerick (IE); Brian O'Loughlin, Limerick (IE); Michael Heelan, Limerick (IE)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 14/958,058

(22) Filed: Dec. 3, 2015

(65) Prior Publication Data

US 2017/0164316 A1 Jun. 8, 2017

(51) Int. Cl.
*H04W 64/00* (2009.01)
*H04W 52/02* (2009.01)
*H04W 4/18* (2009.01)
*H04W 84/12* (2009.01)

(52) U.S. Cl.
CPC ......... *H04W 64/003* (2013.01); *H04W 4/185* (2013.01); *H04W 52/0206* (2013.01); *H04W 84/12* (2013.01); *Y02D 70/00* (2018.01); *Y02D 70/142* (2018.01); *Y02D 70/144* (2018.01); *Y02D 70/164* (2018.01); *Y02D 70/166* (2018.01)

(58) Field of Classification Search
CPC ................................................ H04W 64/003
See application file for complete search history.

(56) References Cited

U.S. PATENT DOCUMENTS

| | | | | |
|---|---|---|---|---|
| 7,756,542 | B1 * | 7/2010 | Kaiser | H04L 41/0816 370/335 |
| 9,628,958 | B1 * | 4/2017 | McBurney | H04W 4/027 |
| 9,699,601 | B2 * | 7/2017 | Grayson | H04W 4/02 |
| 9,699,789 | B2 * | 7/2017 | Jeong | H04M 1/7253 |
| 2003/0179734 | A1 * | 9/2003 | Tsutsumi | H04W 72/0426 370/338 |
| 2008/0143604 | A1 * | 6/2008 | Mock | G01S 5/0205 342/450 |
| 2009/0201850 | A1 * | 8/2009 | Davis | G01S 5/0009 370/328 |
| 2010/0194632 | A1 * | 8/2010 | Raento | H04M 1/72572 342/357.25 |
| 2011/0021207 | A1 * | 1/2011 | Morgan | G01S 5/02 455/456.1 |
| 2011/0080841 | A1 * | 4/2011 | Alizadeh-Shabdiz | G01S 5/02 370/252 |
| 2011/0149938 | A1 * | 6/2011 | Bajko | H04W 56/00 370/338 |

(Continued)

*Primary Examiner* — Parth Patel
(74) *Attorney, Agent, or Firm* — Terrile, Cannatti, Chambers & Holland, LLP; Stephen A Terrile

(57) ABSTRACT

A system, method, and computer-readable medium for performing a geo-tagged beaconing operation. With the geo-tagged beaconing operation, Wi-Fi nodes include geographic information within beacon frames generated by the nodes. In various embodiments, the Wi-Fi nodes include one or more of networking equipment access points, client devices and dedicated Wi-Fi endpoints. Enables a device attempting a Wi-Fi connection to determine its location based upon the geographic information contained within the beacon frame. Upon detecting its location, the Wi-Fi radio then dynamically selects one or more Wi-Fi mode and/or power calibration setting.

15 Claims, 5 Drawing Sheets

(56) References Cited

U.S. PATENT DOCUMENTS

| | | | |
|---|---|---|---|
| 2012/0115512 A1* | 5/2012 | Grainger | G01S 5/0257 455/456.3 |
| 2012/0162013 A1* | 6/2012 | Piersol | H04W 64/003 342/386 |
| 2012/0218979 A1* | 8/2012 | Yeh | H04W 52/0216 370/338 |
| 2012/0314636 A1* | 12/2012 | Liu | H04W 28/065 370/311 |
| 2013/0058320 A1* | 3/2013 | Motonami | H04W 28/22 370/338 |
| 2013/0170432 A1* | 7/2013 | O'Brien | H04W 4/06 370/328 |
| 2013/0250832 A1* | 9/2013 | Kim | H04W 52/0216 370/311 |
| 2013/0279381 A1* | 10/2013 | Sampath | H04W 48/08 370/311 |
| 2013/0286920 A1* | 10/2013 | Shinoki | H04W 52/0248 370/311 |
| 2014/0036683 A1* | 2/2014 | Krishnamurthy | H04W 40/10 370/236 |
| 2014/0064166 A1* | 3/2014 | HomChaudhuri | H04W 52/0216 370/311 |
| 2015/0078229 A1* | 3/2015 | Choi | H04W 56/001 370/311 |
| 2015/0103767 A1* | 4/2015 | Kim | H04W 74/06 370/329 |
| 2015/0133137 A1* | 5/2015 | Lee | H04W 72/0486 455/452.1 |
| 2015/0156723 A1* | 6/2015 | Locher | H04W 48/16 370/311 |
| 2015/0208355 A1* | 7/2015 | Emmanuel | H04W 52/0258 370/311 |
| 2015/0223171 A1* | 8/2015 | Wang | H04W 76/045 455/422.1 |
| 2015/0319700 A1* | 11/2015 | Oteri | H04W 52/10 455/127.1 |
| 2016/0014712 A1* | 1/2016 | Belleschi | H04W 8/005 455/434 |
| 2016/0065719 A1* | 3/2016 | Jeong | H04W 12/06 455/420 |
| 2016/0105843 A1* | 4/2016 | Xue | H04W 48/18 455/426.1 |
| 2016/0117732 A1* | 4/2016 | Zou | G06Q 30/0261 705/14.54 |
| 2016/0150375 A1* | 5/2016 | Yogeeswaran | H04W 4/025 709/205 |
| 2016/0164730 A1* | 6/2016 | Wang | H04L 41/0853 709/221 |
| 2016/0286480 A1* | 9/2016 | Shen | H04W 52/0206 |
| 2016/0321702 A1* | 11/2016 | Lerman | G06Q 30/0267 |
| 2016/0330689 A1* | 11/2016 | Park | H04W 52/0235 |
| 2016/0337945 A1* | 11/2016 | Watt | H04W 48/16 |

\* cited by examiner

GEO-TAGGED BEACONS FOR WI-FI PERFORMANCE OPTIMIZATION

BACKGROUND OF THE INVENTION

Field of the Invention

The present invention relates to information handling systems. More specifically, embodiments of the invention relate to optimizing Wi-Fi.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to connect information handling systems to a network via a Wi-Fi communication technology. The Wi-Fi communication technology provides a local area wireless connection with a network. Information handling systems include a Wi-Fi radio module to perform the wireless communication. Wi-Fi radio modules can require relatively complex mode and power calibration table settings to meet a variety of regulatory requirements for different countries and target markets.

When manufacturing Wi-Fi radio modules (or the information handling systems which include the Wi-Fi radio modules) this requirement can result in a combination of different regional and/or country-specific module stock keeping units (SKUs). When a global SKU is attempted, the wireless transmit power settings are often configured with the set of lowest power values that can meet the regulatory requirements of all countries. So, the country with the most stringent and lowest allowed transmit power is performance limiting for users in countries where higher transmit power is authorized. This approach can result in reduced wireless performance. Accordingly, it would be desirable to address this limitation with dynamic spectrum, bandwidth and RF power optimization.

SUMMARY OF THE INVENTION

A system, method, and computer-readable medium are disclosed for performing a geo-tagged beaconing operation. With the geo-tagged beaconing operation, Wi-Fi nodes include geographic information within beacon frames generated by the nodes. In various embodiments, the Wi-Fi nodes include one or more of networking equipment access points, client devices and dedicated Wi-Fi endpoints.

A beacon frame contains the information necessary for a Wi-Fi client device to start a connection setup procedure. Accordingly, including within the beacon frame the geographic information enables a device attempting a Wi-Fi connection to determine its location. Upon detecting its location, the Wi-Fi radio then dynamically selects one or more calibration settings such as a Wi-Fi mode setting and/or a power calibration setting. These settings can be selected to be compliant with country-specific and/or locale-specific spectrum, bandwidth and power profile settings for where the device is located. In certain embodiments the beacon frame for a wireless local area network is structured to include a geo-tag field. When performing a geo-tagged beaconing operation, to ensure that only valid beacon frames with valid Geo-tags are used, the geo-tagged beaconing operation performs a beacon frame integrity check at the client device side based on a predefined bit map. If the bit map does not correspond to a valid bit map then the beacon frame is discarded.

In certain embodiments, the geo-tag field corresponding to a particular access point includes an access point (AP) region indication (e.g., an AP region field). In certain embodiments, the geo-tag field corresponding to a particular access point includes a time zone indication (e.g., a time zone field). The AP Region field is programmed when the access point is fabricated (e.g., at the factory) and can be reconfigured later if necessary via database lookup. The time zone field is automatically selected once the access point is connected to the Internet. In certain embodiments the time zone field cannot be changed. This prevents conflicts from occurring in the event that two different access points have different Geo-Tags. Even if the region field is different on two different access points, the time zone field is always the same. Thus the time zone field is used by the client side to make the Geo-tag determination. The networking equipment access points and dedicated Wi-Fi beacons get configured with the geo information via an access query to a database that contains geo-location information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
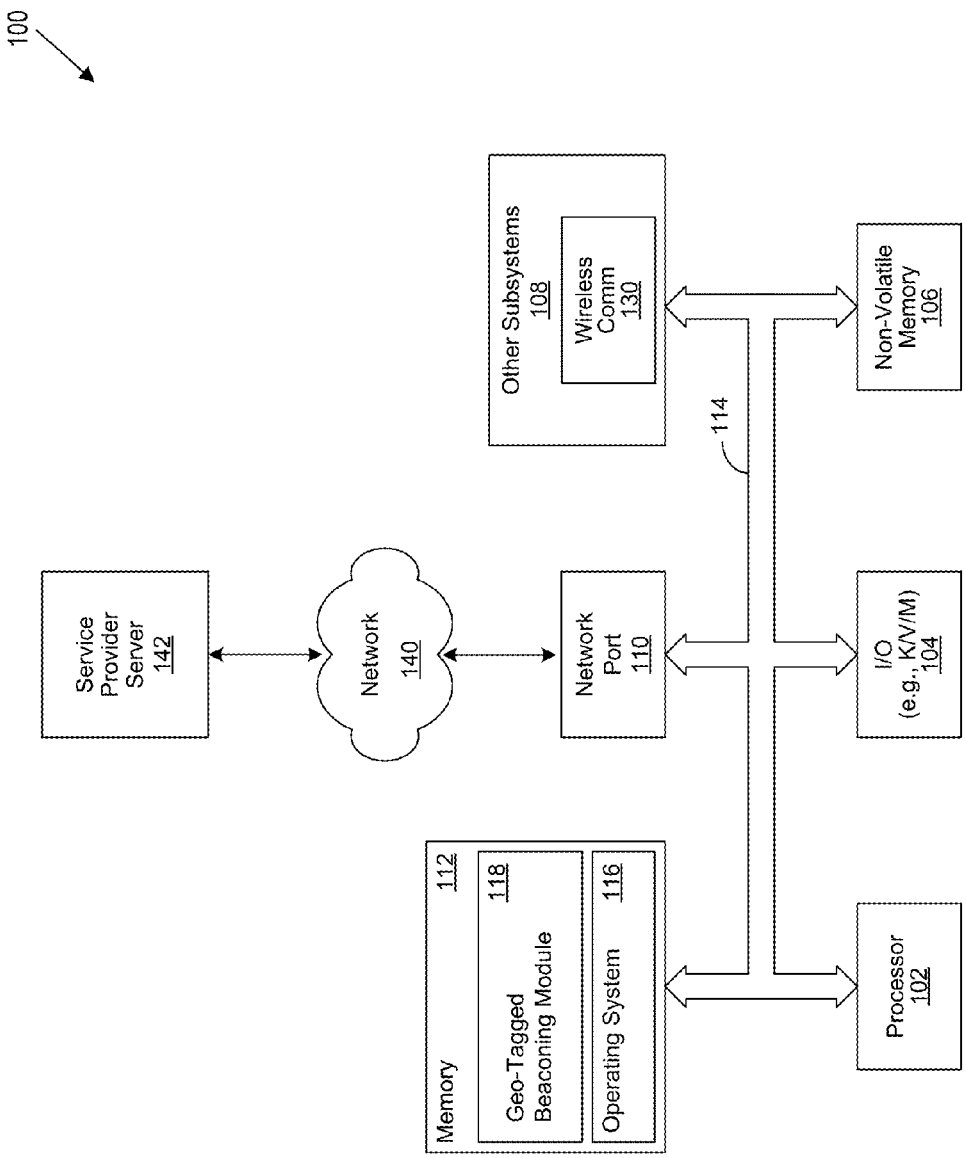
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a geo-tagged beaconing module 118. In various embodiments, the other subsystems 108 can also include a wireless communication module 130 such as a Wi-Fi 802.11b/g/n/ac radio. In certain embodiments, the geo-tagged beaconing module 118 may be stored within and/or executed on a processor (such as a Wi-Fi radio processor) within the wireless communication module 130.

The geo-tagged beaconing module 118 performs some or all of the functions of a geo-tagged beaconing operation. More specifically, with the geo-tagged beaconing operation, Wi-Fi nodes include geographic information within beacon frames generated by the nodes. In various embodiments, the Wi-Fi nodes include one or more of networking equipment access points, client devices and dedicated Wi-Fi endpoints.

Figure 2:
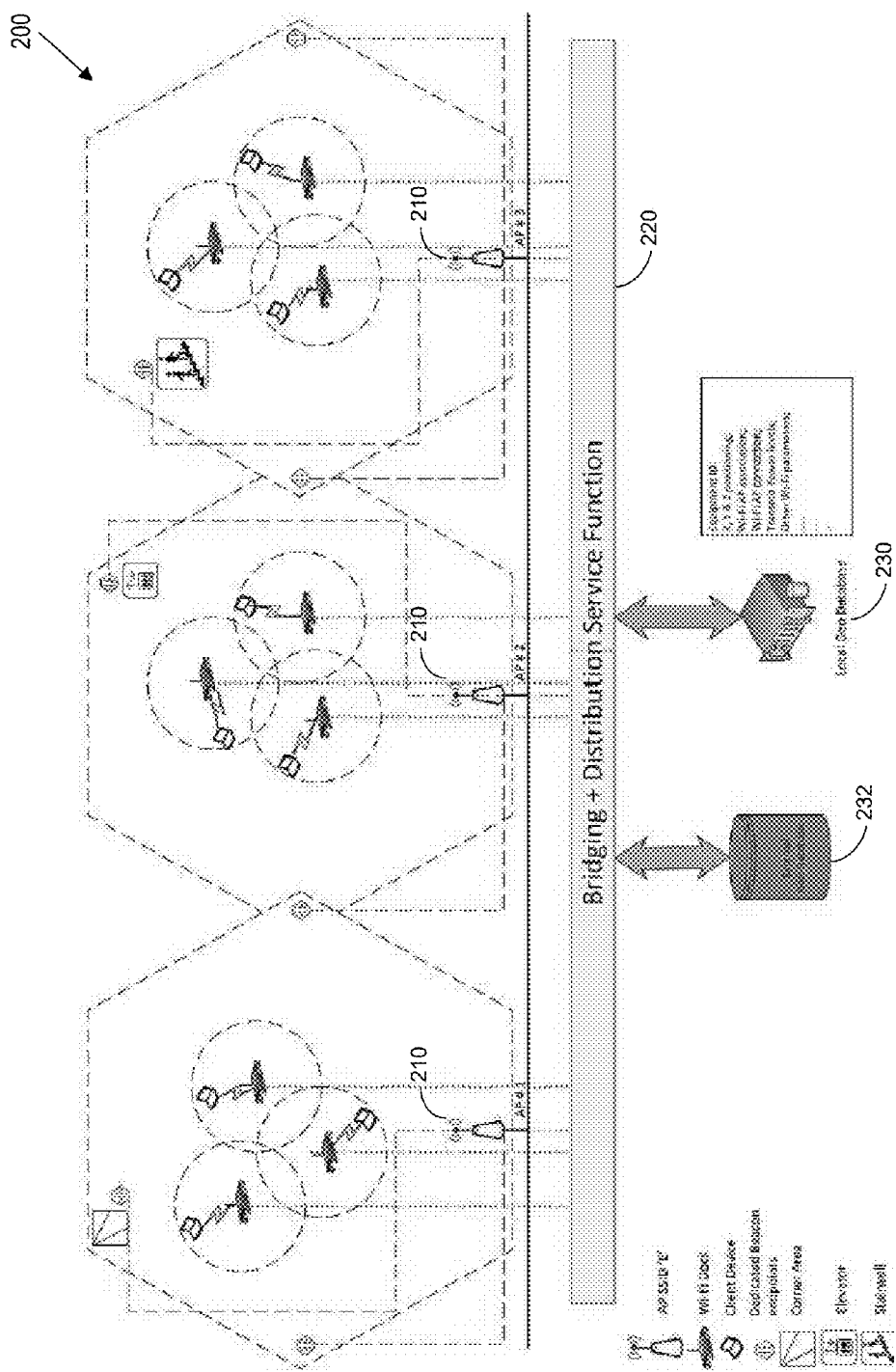
FIG. 2 shows a block diagram of an example network environment.

FIG. 2 shows a block diagram of an example network environment 200. The example network environment 200 includes a plurality of access points 210 (AP 1, AP 2, AP 3). The network environment 200 also includes a bridging and distribution service function system 220 as well as a local geographic information repository 230 and an external geographic information repository 232. The environment may further include one or more devices communicating via the networking environment 200. These devices can include a Wi-Fi dock and a client device. The access points may also be coupled to dedicated beacon endpoints which can be used to increase the Wi-Fi signal to locations such as stairwells, corners and elevators.

A beacon frame contains the information necessary for a Wi-Fi client device to start a connection setup procedure. Accordingly, including within the beacon frame the geographic information enables a device attempting a Wi-Fi connection to determine its location. Upon detecting its location, the Wi-Fi radio then dynamically selects one or more Wi-Fi mode and/or power calibration setting. These settings can be selected to be compliant with country-specific and/or locale-specific spectrum, bandwidth and power profile settings for where the device is located.

The following table shows an example of settings for the US (FCC):

| | | 2.4 GHz-20 MHz | | | | | | |
|---|---|---|---|---|---|---|---|---|
| | Control/Central | 20 MHz CCK | | | 20 MHz OFDM | | | |
| Central Freq. | Channel | SISO A | SISO B | DD | SISO A | SISO B | MIMO 2 | BFer2 |
| 2412 | 1 | 15.0 | 15.0 | 15.0 | 12.5 | 13.0 | 10.5 | 8.5 |
| 2417 | 2 | 16.0 | 16.0 | 16.0 | 14.0 | 14.0 | 12.0 | 10.0 |
| 2422 | 3 | 16.0 | 16.0 | 16.0 | 16.0 | 16.0 | 16.0 | 16.0 |
| 2427 | 4 | 16.0 | 16.0 | 16.0 | 16.0 | 16.0 | 16.0 | 16.0 |
| 2432 | 5 | 16.0 | 16.0 | 16.0 | 16.0 | 16.0 | 16.0 | 16.0 |
| 2437 | 6 | 16.0 | 16.0 | 16.0 | 16.0 | 16.0 | 16.0 | 16.0 |
| 2442 | 7 | 16.0 | 16.0 | 16.0 | 16.0 | 16.0 | 16.0 | 16.0 |
| 2447 | 8 | 16.0 | 16.0 | 16.0 | 16.0 | 16.0 | 16.0 | 16.0 |
| 2452 | 9 | 16.0 | 16.0 | 16.0 | 16.0 | 16.0 | 16.0 | 16.0 |
| 2457 | 10 | 16.0 | 16.0 | 16.0 | 14.0 | 14.0 | 12.0 | 10.0 |
| 2462 | 11 | 15.0 | 15.0 | 15.0 | 11.0 | 11.0 | 10.5 | 8.5 |
| 2467 | 12 | 10.5 | 12.0 | 10.5 | 8.5 | 7.5 | 5.5 | 5.0 |
| 2472 | 13 | 9.5 | 11.0 | 9.5 | 0.0 | 0.0 | 0.0 | 0.0 |
| 2484 | 14 | 0 | 0 | 0 | 0 | 0 | 0 | 0 |

The following table shows an example of settings for the Rest of World (RoW):

| | | 2.4 GHz-20 MHz | | | | | | |
|---|---|---|---|---|---|---|---|---|
| | Control / Central | 20 MHz CCK | | | 20 MHz OFDM | | | |
| Central Freq. | Channel | SISO A | SISO B | DD | SISO A | SISO B | MIMO 2 | BFer2 |
| 2412 | 1 | 14.5 | 14.5 | 11.5 | 15.0 | 15.0 | 12.0 | 9.0 |
| 2417 | 2 | 14.5 | 14.5 | 11.5 | 15.0 | 15.0 | 12.0 | 9.0 |

2.4 GHz-20 MHz

| Central Freq. | Control / Central Channel | 20 MHz CCK | | | 20 MHz OFDM | | | |
|---|---|---|---|---|---|---|---|---|
| | | SISO A | SISO B | DD | SISO A | SISO B | MIMO 2 | BFer2 |
| 2422 | 3 | 14.5 | 14.5 | 11.5 | 15.0 | 15.0 | 12.0 | 9.0 |
| 2427 | 4 | 14.5 | 14.5 | 11.5 | 15.0 | 15.0 | 12.0 | 9.0 |
| 2432 | 5 | 14.5 | 14.5 | 11.5 | 15.0 | 15.0 | 12.0 | 9.0 |
| 2437 | 6 | 14.5 | 14.5 | 11.5 | 15.0 | 15.0 | 12.0 | 9.0 |
| 2442 | 7 | 14.5 | 14.5 | 11.5 | 15.0 | 15.0 | 12.0 | 9.0 |
| 2447 | 8 | 14.5 | 14.5 | 11.5 | 15.0 | 15.0 | 12.0 | 9.0 |
| 2452 | 9 | 14.5 | 14.5 | 11.5 | 15.0 | 15.0 | 12.0 | 9.0 |
| 2457 | 10 | 14.5 | 14.5 | 11.5 | 15.0 | 15.0 | 12.0 | 9.0 |
| 2462 | 11 | 14.5 | 14.5 | 11.5 | 15.0 | 15.0 | 12.0 | 9.0 |
| 2467 | 12 | 14.5 | 14.5 | 11.5 | 15.0 | 15.0 | 12.0 | 9.0 |
| 2472 | 13 | 14.5 | 14.5 | 11.5 | 15.0 | 15.0 | 12.0 | 9.0 |
| 2484 | 14 | 0 | 0 | 0 | 0 | 0 | 0 | 0 |

In certain embodiments, the beacon frame for a wireless local area network is structured to include a geo-tag field. When performing a geo-tagged beaconing operation, to ensure that only valid beacon frames with valid Geo-tags are used, the geo-tagged beaconing operation performs a beacon frame integrity check at the client device side based on a predefined bit map. If the bit map does not correspond to a valid bit map then the beacon frame is discarded.

Any of a plurality of technologies may be used to obtain the geo-location data that is populated in the local geographic information repository 230 and an external geographic information repository 232. These technologies include fixed location beacons (e.g. using Bluetooth Low Energy) technology, radio frequency identification (RFID) technology, Light Emitting Diodes (LEDs), global navigation satellite system (GNSS)/Assisted-GNSS technology, global system for mobile communications (GSM) Cell ID technology, Wi-Fi fingerprinting technology, etc.

Figure 3:
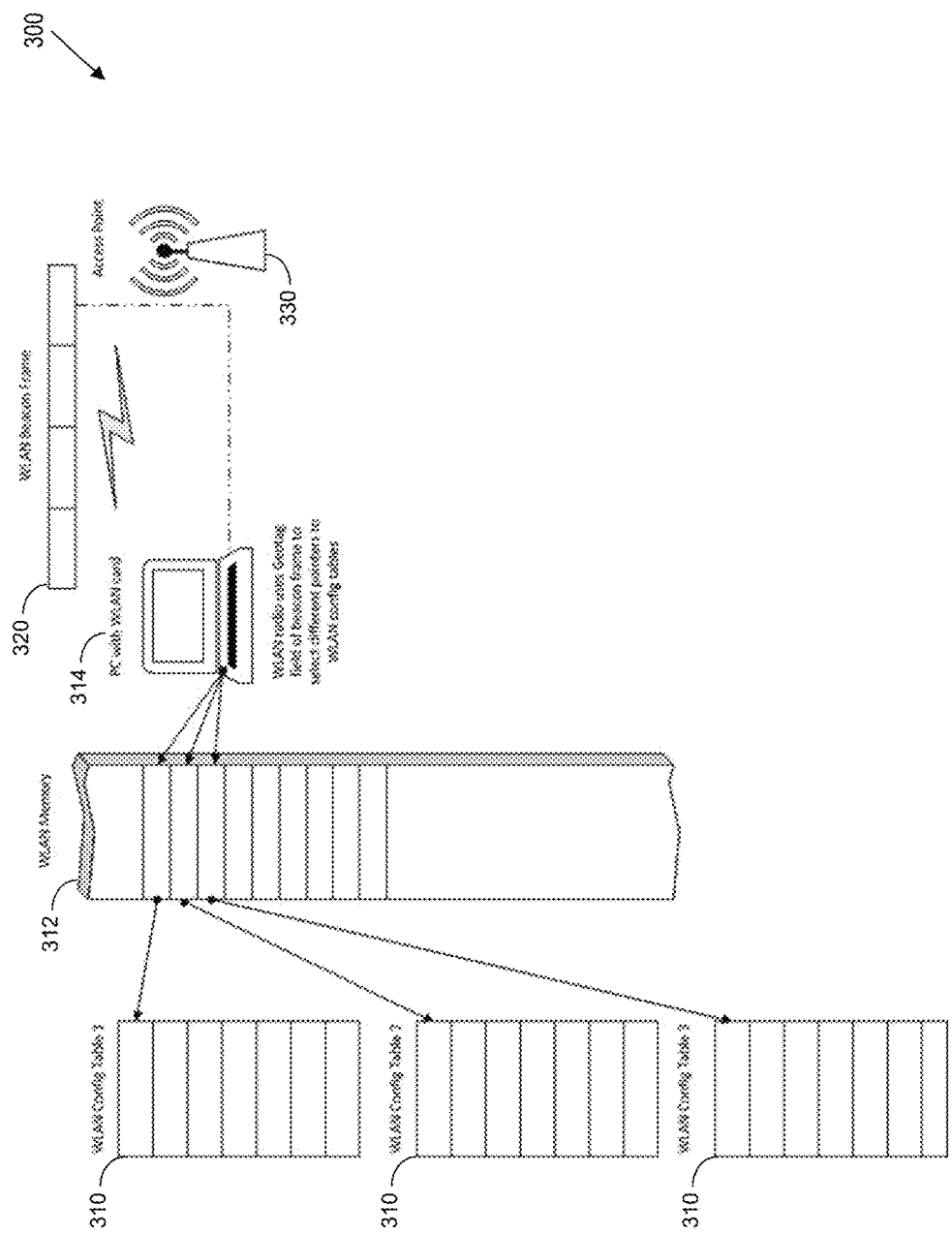
FIG. 3 shows a block diagram of a device configuration table selection operation.

FIG. 3 shows a block diagram of a device configuration table selection operation 300. More specifically, when performing a device configuration table selection operation 300 a plurality of configuration tables 310 are preconfigured (e.g., by a Wi-Fi module vendor) with the specific radio parameters that are relevant for specific region/country. The plurality of configuration tables 310 are stored within a memory 312 which is accessible by a device 314 containing a WLAN module (e.g., a client device). In certain embodiments the memory is associated with the WLAN module. In certain embodiments, these specific radio parameters provide optimum performance for a particular geographic location (e.g., a particular region and/or country). The configuration tables 310 that contain the relevant WLAN module configuration settings are selected based on a Geo-Tag field in a beacon frame 320 which is generated by an access point 330 (e.g., access point 210). Different Geo-tags are used to select different pointers which select different WLAN configuration tables that are used to reconfigure the WLAN module for a new set of radio operating parameters optimized for the geographic location in which a device containing the WLAN module (e.g., a client device) is located.

Figure 4:
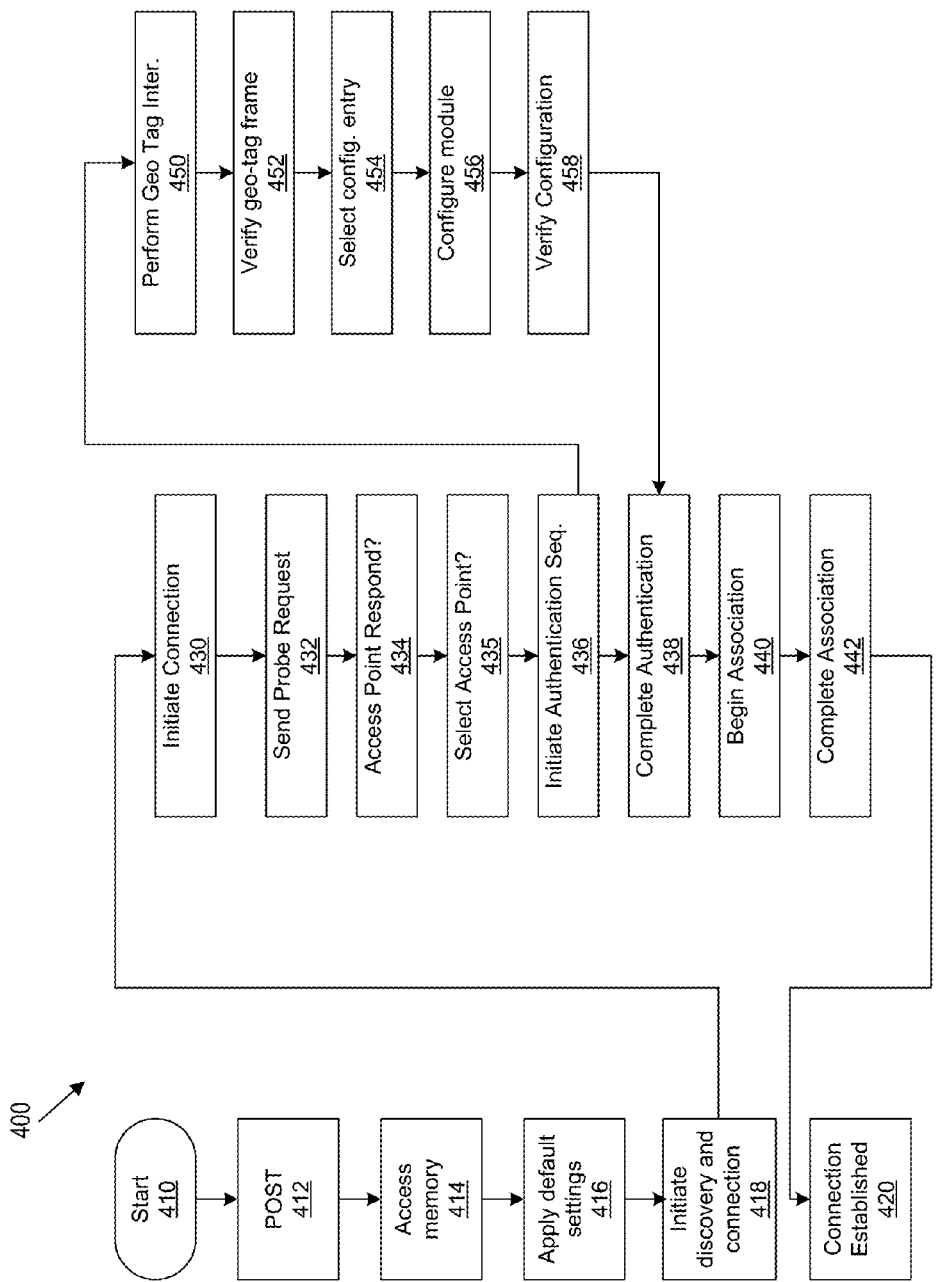
FIG. 4 shows a flow chart of a geo-tagged beaconing operation.

FIG. 4 shows a flow chart of a geo-tagged beaconing operation 400. More specifically, the operation begins at step 410 when a device having a wireless communication module powers on. Next at step 412, a power on self-test (POST) operation is performed on the wireless communication module (e.g., a wireless card). Next at step 414 a memory associated with the wireless communication module is accessed to obtain default regulatory settings for the wireless communication module. Next at step 416 the default regulatory settings are applied to the wireless communication module. Next at step 418 the wireless communication module initiates a discovery and connection process to enable communication between the device and a Wi-Fi network. Upon completion of the discovery and connection process a connection is established and data flow is active at step 420.

The discovery and connection process of step 418 further includes the mobile device initiating a connection at step 430 and sending a probe request at step 432. Next, the wireless communication module determines whether any access points within range have responded at step 434. The wireless communication module then selects an access point from those that responded at step 435. This access point may be the nearest access point, a preferred access point or an access point which is generated the strongest signal. Next at step 436 the wireless communication module initiates an authentication sequence. At step 438 the authentication process completes. Next at step 440 an association process begins and at step 442 the association process completes and the operation proceeds to step 420.

The authentication process of step 436 further includes performing a geo tag interrogation operation at step 450. Next, the wireless communication module verifies that a valid geo-tag frame is received at step 452. Next, at step 454, the wireless communication module selects a configuration entry from the plurality of configuration tables. This entry includes a set of predefined communication module configuration options based upon a geographic location. Next at step 456, the wireless communication module is configured according to the predefined communication module configuration operations corresponding to the present geographic location of the device having the wireless communication module. Next at step 458, the configuration is verified and the operation proceeds to step 438 where the authentication process completes. In certain embodiments, the configuration is verified by performing a memory read-back operation and then checking for bit-matching to a written bitmap with no errors.

Figure 5:
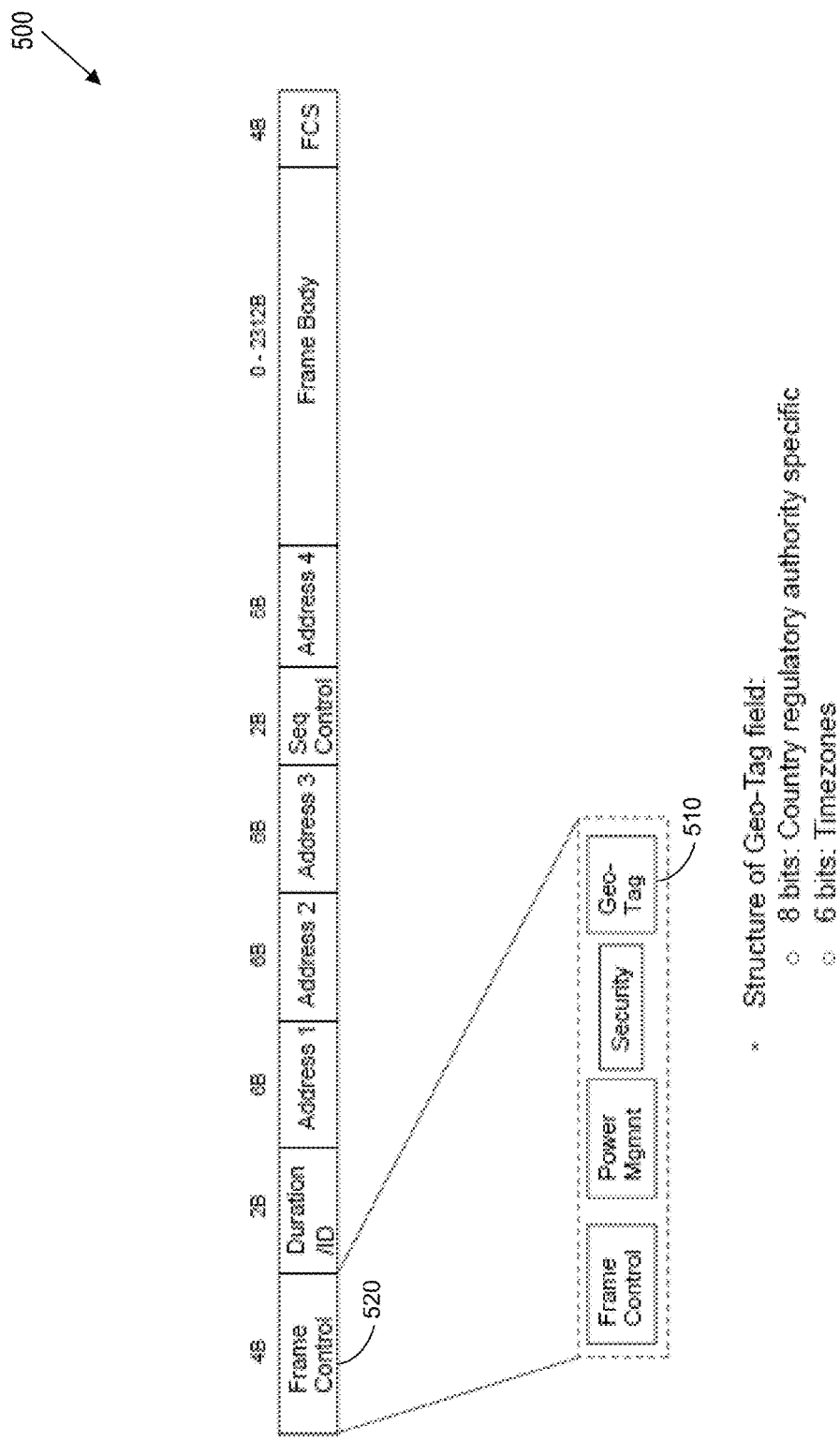
FIG. 5 shows a block diagram of an example beacon frame.

FIG. 5 shows a block diagram of an example beacon frame 500. More specifically, the example beacon frame 500 includes a geo-tag field 510. In certain embodiments, the geo-tag field is included within a frame control field 520 of the beacon frame 500.

In certain embodiments, the geo-tag field corresponding to a particular access point includes an access point (AP)

region indication (e.g., an AP region field). In certain embodiments, the AP region field is an 8-bit field. The AP Region field is programmed when the access point is fabricated (e.g., at the factory) and can be reconfigured later if necessary via database lookup.

In certain embodiments, the geo-tag field corresponding to a particular access point includes a time zone indication (e.g., a time zone field). In certain embodiments the time zone field is a 6-bit field. The time zone field is automatically selected once the access point is connected to the Internet. In certain embodiments the time zone field cannot be changed. This prevents conflicts from occurring in the event that two different access points have different Geo-Tags. Even if the region field is different on two different access points, the time zone field is always the same. Thus, the time zone field is used by the client side to make the Geo-tag determination. The networking equipment access points and dedicated Wi-Fi beacons get configured with the geo information via an access query to a database that contains geo-location information.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a geo-tagged beaconing operation, comprising:
    providing geographic information within a beacon frame generated by a Wi-Fi node, the geographic information being included within a frame control field of the beacon frame;
    connecting a device to the Wi-Fi node;
    determining a geographic location of the device using the geographic information included within the beacon frame attempting a Wi-Fi connection to determine its location; and,
    configuring a communication module based upon the geographic location; and wherein the beacon frame comprises an access point (AP) region indication and a time zone indication field; and
    the determining a geographic location uses the time zone indication field if the AP region indications for two different access points are different.

2. The method of claim 1, wherein:
the Wi-Fi node is one of a plurality of Wi-Fi nodes;
the plurality of Wi-Fi nodes includes one or more of networking equipment access points, client devices and dedicated Wi-Fi endpoints.

3. The method of claim 1, wherein:
the configuring further comprises selecting at least one of a Wi-Fi mode and a power calibration setting based upon the geographic location.

4. The method of claim 1, wherein:
the configuring enables the communication module to be compliant with geographic specific Wi-Fi settings.

5. The method of claim 1, further comprising:
performing a beacon frame integrity check at the client device side based on a predefined bit map to ensure that a valid beacon frame with a valid geo-tag is used.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
  providing geographic information within a beacon frame generated by a Wi-Fi node, the geographic information being included within a frame control field of the beacon frame;
  connecting a device to the Wi-Fi node;
  determining a geographic location of the device using the geographic information included within the beacon frame attempting a Wi-Fi connection to determine its location; and,
  configuring a communication module based upon the geographic location; and wherein
the beacon frame comprises an access point (AP) region indication and a time zone indication field; and
the determining a geographic location uses the time zone indication field if the AP region indications for two different access points are different.

7. The system of claim 6, wherein:
the Wi-Fi node is one of a plurality of Wi-Fi nodes
the plurality of Wi-Fi nodes includes one or more of networking equipment access points, client devices and dedicated Wi-Fi endpoints.

8. The system of claim 6, wherein:
the configuring further comprises selecting at least one of a Wi-Fi mode and a power calibration setting based upon the geographic location.

9. The system of claim 6, wherein:
the configuring enables the communication module to be compliant with geographic specific Wi-Fi settings.

10. The system of claim 6, wherein the instructions are further configured for:
performing a beacon frame integrity check at the client device side based on a predefined bit map to ensure that a valid beacon frame with a valid geo-tag is used.

11. A non-transitory, computer-readable storage medium embodying computer program code, the computer program code comprising computer executable instructions configured for:
  providing geographic information within a beacon frame generated by a Wi-Fi node;
  connecting a device to the Wi-Fi node, the geographic information being included within a frame control field of the beacon frame;
  determining a geographic location of the device using the geographic information included within the beacon frame attempting a Wi-Fi connection to determine its location; and,
  configuring a communication module based upon the geographic location; and wherein
the beacon frame comprises an access point (AP) region indication and a time zone indication field; and
the determining a geographic location uses the time zone indication field if the AP region indications for two different access points are different.

12. The non-transitory, computer-readable storage medium of claim 11, wherein:
the Wi-Fi node is one of a plurality of Wi-Fi nodes;
the plurality of Wi-Fi nodes includes one or more of networking equipment access points, client devices and dedicated Wi-Fi endpoints.

13. The non-transitory, computer-readable storage medium of claim 11, wherein:
the configuring further comprises selecting at least one of a Wi-Fi mode and a power calibration setting based upon the geographic location.

14. The non-transitory, computer-readable storage medium of claim 11, wherein:
the configuring enables the communication module to be compliant with geographic specific Wi-Fi settings.

15. The non-transitory, computer-readable storage medium of claim 11, wherein the computer executable instructions are further configured for:
performing a beacon frame integrity check at the client device side based on a predefined bit map to ensure that a valid beacon frame with a valid geo-tag is used.

* * * * *